United States Patent [19]
Koning et al.

[11] Patent Number: 5,280,101
[45] Date of Patent: Jan. 18, 1994

[54] POLYIMIDE

[75] Inventors: Cornelis E. Koning, Schinnen, Netherlands; Lilian M. J. Teuwen, Maaseik, Belgium; Egbert W. Meijer, Waalre, Netherlands

[73] Assignee: DSM N.V., Heerlen, Netherlands

[21] Appl. No.: 911,745

[22] Filed: Jul. 10, 1992

[30] Foreign Application Priority Data

Jul. 11, 1991 [NL] Netherlands .................... 9101219

[51] Int. Cl.$^5$ .................... C08C 73/10; C08C 69/26; C08C 8/02
[52] U.S. Cl. .................... 528/229; 528/125; 528/128; 528/172; 528/173; 528/179; 528/185; 528/188; 528/220; 528/350; 528/353
[58] Field of Search ............... 528/125, 128, 229, 220, 528/172, 173, 179, 185, 188, 350, 353

[56] References Cited

U.S. PATENT DOCUMENTS

| | | | |
|---|---|---|---|
| 3,644,168 | 2/1972 | Bonk et al. | 428/73 |
| 3,759,913 | 9/1973 | Blackley | 528/229 |
| 4,818,603 | 4/1989 | Mueller | 428/473.5 |

OTHER PUBLICATIONS

CA 92(20): 164392e; "Crystallization of Alkyl-aromatic Polyimides (Polyalkylamimids)", Kurshak, et al.

Macromolecular Reviews vol. 11, J. Poly. Sci., pp. 161-208, "Polyimides", Sroog., (1976).
Hackh's Chemical Dictionary, 4th ed., p. 555.

Primary Examiner—John Kight, III
Assistant Examiner—P. Hampton-Hightower
Attorney, Agent, or Firm—Cushman, Darby & Cushman

[57] ABSTRACT

The invention relates to a polyimide substantially built up from monomeric units of 3,3',4,4'-benzophenonetetracarboxylic dianhydride and monomeric units of a primary aliphatic diamine. The polyimide according to the invention is characterized in that the primary aliphatic diamine is substantially 1,4-diaminobutane. The thermal stability of the polyimide according to the invention has surprisingly been found to be very good. Owing to this very good thermal stability, the polyimides according to the invention can very well be processed at—relatively—high processing temperatures without any appreciable thermal degradation of the polyimide. As a result, the polyimides processing potential has increased considerably. Also, articles made of the polyimides according to the invention can be used at significantly higher temperatures. Said articles have very good mechanical properties. Articles containing a polyimide are suited for being used in the most diverse applications. Application within a large number of industries may be thought of, such as the electrical, electronic and automotive industries. In space travel, too, the interest in such polyimides is great.

3 Claims, No Drawings

POLYIMIDE

The invention to a polyimide substantially built up from monomeric units of 3,3',4,4'-benzophenonetetracarboxylic dianhydride and monomeric units of a primary aliphatic diamine.

Such polyimides have previously been described by W. D. Blackley in U.S. Pat. No. 3,759,913. The polyimides described therein are built up from monomeric units of 3,3',4,4'-benzophenonetetracarboxylic dianhydride and monomeric units of a primary aliphatic diamine, which contains 3–12 carbon atoms. The good properties of these thermosetting polymers are discussed in detail in the above-mentioned patent publication. The polyimides according to U.S. Pat. No. 3,759,913 have been found to possess a good thermal stability at 200° C., which is evident from the fact that at that temperature very few volatile components are released. These polyimides are not particularly stable during processing at higher processing temperatures. This has been confirmed by C. E. Sroog in J. Polymer Sci.: Macromolecular Reviews, vol. 11, 161–208 (1976), where it is stated, that polyimides the diamines of which contain relatively few (for instance fewer than seven) carbon atoms between the primary amine groups have a poor thermal stability at higher temperatures. The poor thermal stability constitutes a serious restriction in respect of the processing of the polyimides into moulding compounds.

In view of the modern developments, with ever higher demands in respect of the properties of articles, such as heat resistance and strength, and the processability of polymers into articles, the thermal stability of these polyimides is insufficient. The application of such polyimides is limited to relatively thick articles, which are brittle at that.

The object of the present invention is to produce a polyimide that does not exhibit said disadvantages. The polyimide according to the invention is characterized in that the primary aliphatic diamine is substantially 1,4-diaminobutane.

The thermal stability of the polyimide according to the invention has surprisingly been found to be very good. Owing to this very good thermal stability, the polyimides according to the invention can very well be processed at—relatively—high processing temperatures without any appreciable thermal degradation of the polyimide. As a result, the polyimides processing potential has increased considerably. During the thermoplastic processing of the polyimide according to the invention the polymer is exposed, for a certain length of time, to a—relatively—very high processing temperature. Owing to the use of these high processing temperatures, the polyimide allows itself to be processed more easily, because the viscosity of the polymer is considerably lower then. Also, articles made of the polyimides according to the invention can be used at significantly higher temperatures. Said articles have very good mechanical properties.

Articles containing a polyimide are suited for being used in the most diverse applications. Application within a large number of industries may be thought of, such as the electrical, electronic and automotive industries. In space travel, too, the interest in such polyimides is great.

According to the invention, the polyimide is built up substantially of monomeric units of 3,3',4,4'-benzophenonetetracarboxylic dianhydride. Optionally small amounts of other bifunctional carboxylic anhydrides can be used as comonomer. Examples of such monomeric units are pyromellitic dianhydride, 4,4'-oxydiphthalic anhydride, 3,3',4,4'-biphenyltetracarboxylic dianhydride, 2,3,3',4'-biphenyltetracarboxylic dianhydride, 3,3',4,4'-diphenylsulphonetetracarboxylic dianhydride, 3,3',4,4'-diphenylpropane 2,2-tetracarboxylic dianhydride, 2,2-bis(3,4-dicarboxyphenyl)propane dianhydride, 1,4-bis(3,4-dicarboxybenzoyl)benzene dianhydride, 1,3-bis(3,4-dicarboxybenzoyl)benzene dianhydride, bis(3,4-dicarboxyphenyl) thioether dianhydride, 2,2-bis(3,4-dicarboxyphenyl)hexafluoropropane dianhydride, spiro bisindane dietheranhydride and bisphenol-A bisether-4-phthalic dianhydride.

The bifunctional carboxylic anhydride contained in the polyimide consists of at least 50 moles % 3,3',4,4'-benzophenonetetracarboxylic dianhydride. Preferably the bifunctional carboxylic anhydride contained in the polyimide consists of at least 75 moles % 3,3',4,4'-benzophenonetetracarboxylic dianhydride. More preferably said percentage is at least 95.

According to the invention the primary aliphatic diamine contained in the polyimide substantially consists of the monomeric unit of 1,4-diaminobutane. The polyimide according to the invention may optionally contain small amounts of one or more other primary aliphatic or aromatic diamines. Examples of such diamines are ethylenediamine, trimethylenediamine, hexamethylenediamine, nonamethylenediamine, decamethylenediamine, benzidine, meta-phenylenediamine, para-phenylenediamine, 4,4'-oxydianiline, 4,4'-diaminodiphenylmethane, 2,4'-diaminodiphenylmethane, 4,4'-diaminodiphenyl ether, 2,4'-diaminodiphenyl ether, 4,4'-diaminobenzophenone, 4,4'-diaminodiphenylsulphone, 3,3'-diaminodiphenylsulphone, 4,4'-diaminodiphenylethane-1,1, 4,4'-diaminodiphenylpropane-2,2 and 4,4'-bis(4-aminophenoxy)-diphenylsulphone.

The diamine contained in the polyimide consists of at least 50 moles % diaminobutane. The diamine contained in the polyimide preferably consists of at least 75 moles % diaminobutane. More preferably this percentage is at least 95.

The synthesis of polyimides is common knowledge and is described, for instance, in U.S. Pat. No. 3,759,913.

To the polyimide according to the invention additives may be added, if so desired. Examples of customary additives are stabilizers, antioxidants, lubricants, fillers, colourants, pigments, flame retardants, impact modifiers, reinforcing fibres and conductive fibres. The additives can be added if so desired before or during the processing step.

The polyimide according to the invention can be processed thermoplastically in any known manner. Equipment suited for this purpose is, for instance, a single or twin-screw extruder, a static mixer, an injection moulding machine and a roll mill. In view of its very good thermal stability, the polyimide according to the invention can very well be processed thermoplastically. As a result, this polymer is extremely suited for the production of all sorts of articles. Therefore, the invention also relates to such articles. In this connection articles, such as moulding compounds, fibres, films and the widest variety of injection-moulded articles may be thought of.

As the polyimide according to the invention can be processed thermoplastically and also possesses a very good thermal stability, it is quite possible to produce a polymer composition of the polyimide according to the invention with other thermoplastic polymers. If so desired, compatibilizers can be used also. The polyimide according to the invention is extremely suited to be blended with other thermoplastic polymers having a processing temperature comparable with the processing temperature of this polyimide. Examples of such polymers are polycarbonates, nylon 6, nylon 6,6, nylon 4,6, nylon 6,9, nylon 11, nylon 12, nylon 6,T, polyarylates, polysulphones, polyphenylene oxide, polyethyleneterephthalate, styrene-maleimide copolymers, polybutyleneterephthalate. Other suitable polymers are, for instance, ethene-propene rubbers, optionally containing a third comonomer, like for example a diene monomer.

The invention will further be elucidated by means of the following examples without being limited thereto. In addition to the thermal properties, a number of mechanical properties of the resulting products are determined in the examples also. The table below shows according to what methods this has been done:

| | |
|---|---|
| toughness, Izod [kJ/m$^2$]: | ASTM-D256, method A (hammer speed 2.9 m/s) |
| toughness, G$_c$ [kJ/m$^2$]: | determined according to the IZOD test method described by E. Plati and J. G. Williams in Pol.Eng.Sci., June 1975, vol.15, no.6, pp.470-477 |
| E-modulus, [N/mm$^2$]: | three-point flexural test according to ASTM-D790 |
| Vicat-B. [°C.]: | ASTM-D1525 |
| LOI, [%]: | ASTM-D2863 |
| moisture absorption in 24 hours (23° C.), immersed in water, [%]: | ASTM-D570 |

EXAMPLES

EXAMPLE I

For the purpose of preparing the polyimide according to the invention, 14.4 grammes 1,4-diaminobutane (DAB) was dissolved in 200 ml N-methyl-2-pyrrolidone (NMP) in an N$_2$ atmosphere. Subsequently, at a temperature of 0°-5° C., a solution of 52.6 grammes 3,3',4,4'-benzophenonetetracarboxylic anhydride (BTDA) in 450 ml NMP was added dropwise. To the solution of BTDA in NMP also 0.5 mole % phthalic anhydride (calculated on the amino end groups of DAB) had been added as chain stopper. The resulting solution was then stirred overnight at a temperature of 23° C. while forming the polyamide-acid intermediate product.

After addition of 20 ml xylene to the solution and 10 ml xylene in the so-called Dean-Stark trap, the solution was heated to 160° C. and then (during refluxing) kept at this temperature for 4 hours. During the refluxing, water was removed by azeotropic distillation. After cooling, the product was precipitated in methanol, upon which it was filtered and dried at a temperature of 60° C. and at reduced pressure.

Of the resulting poly(BTDA-DAB) powder both the glass transition temperature T$_g$ and the melting temperature Tm were determined by means of a differential scanning calorimeter analysis (DSC, 20° C./min). Also, the thermal stability was determined by means of a thermogravimetric analysis (TGA, 20° C./min) of the powder obtained. This analysis served to determine at what temperature a 10% weight reduction was reached. This temperature is a good measure for the thermal stability. The thermal properties are mentioned in table 1. For the purpose of completeness, a few test bars were injection-moulded (temperature of the melt 360° C., temperature of the mould 110° C.), by means of which test bars a number of mechanical properties were measured. These properties are mentioned in table 2.

EXAMPLE II

On the analogy of example I, a polyimide was prepared, but this time without adding the phthalic anhydride chain stopper. Of this polyimide, the thermal properties were determined as well. These are mentioned in table 1.

EXAMPLE III

On the analogy of example I a polyimide was prepared. However, this time 25% of the diaminobutane was replaced by 4,4-oxydianiline (ODA). Of this polyimide, too, a number of thermal properties were measured, which are mentioned in table 1.

For the purpose of comparison, a number of thermal properties of the polyimides synthesized in the examples of U.S. Pat. No. 3,759,913 are mentioned in table 1. In this table, the melting temperature, T$_m$, the glass transition temperature, T$_g$, and the thermal stability of these polyimides are mentioned. A is the polyimide made of BTDA and hexamethylenediamine; B is the polyimide made of BTDA and nonamethylenediamine; C is the polyimide made of BTDA and octamethylenediamine; D is the polyimide made of BTDA and 1,3-diaminopropane.

TABLE 1

Thermal properties of the polyimides of examples I to III inclusive and of polyimides A to D inclusive.

| example/ polyimides | T$_g$ [°C.] | T$_m$ [°C.] | 10% loss of weight (TGA measurement) |
|---|---|---|---|
| I | 172 | 284 | 501 |
| II | 163 | 303 | 479 |
| III | 194 | ND | 494 |
| A | 138-147 | 250 | 460 |
| B | 93-100 | 160 | 443 |
| C | 99-110 | 180 | 455 |
| D | 170-178 | ~300 | 455 |

ND = Not Detectable (amorphous)

From U.S. Pat. No. 3,759,913 a relation is known between, on the one side, the number of carbon atoms between the amine groups of the diamine used and, on the other, the melting and glass transition temperatures of the polyimide. The melting and glass transition temperatures of the polyimides of examples I and II also follow this relation. Surprisingly, however, it has been found that the thermal stability of the polyimides according to the invention is much higher that that of the polyimides from U.S. Pat. No. 3,759,913. Consequently, much higher processing temperatures can be applied, so that the polyimides processing potential has substantially increased. Moreover, the polyimides according to the invention can be used at significantly higher temperatures.

TABLE 2

Mechanical properties of the polyimide from example I

| | |
|---|---|
| toughness, Izod | 2.9 kJ/m$^2$ |
| toughness, G$_c$ | 3.8 kJ/m$^2$ |
| E-modulus | 5103 N/mm$^2$(*) |
| Vicat | >260° C. |
| LOI | 25.5% |

TABLE 2-continued

Mechanical properties of the polyimide from example I

| moisture absorption | 0.35% |
|---|---|

(*)upon annealing (2 hours, 220° C.) the modulus was 7500 N/mm²

EXAMPLE IV

The (BTDA-DAB)polyimide according to example I was compression moulded. Therefore the poly(BTDA-DAB) powder was enveloped in Teflon sheets and compression moulded between two plates at a temperature of 317° C. (two minutes at a pressure of 19 bar and 2 minutes at a pressure of 128 bar). Subsequently the sheet was cooled down under a pressure of 150 kN to a temperature of 20° C. The density of the obtained sheet was 1.4 g/cm³.

Of the obtained sheet several mechanical properties were measured which are mentioned in table 3. A tape, cut out of the sheet was used to measur the tensile strength, the modulus of elasticity and the elongation at break. The measurements were carried out according to ASTM D 638 on a Zwick-1435 tensile tester (speed 3 mm/min, length tape 30 mm).

TABLE 3

Mechanical properties of the poly(BTDA-DAB) sheet

| draw ratio (—) | 1 | 4 | 5 |
|---|---|---|---|
| modulus of elasticity (ASTM D 638, —) | 2.8 | 7.7 | 9.3 |
| tensile strength (ASTM D 638, GPa) | | 0.26 | 0.38 |
| elongation at break $\epsilon_b$ (%) | 14 | 4 | 6 |

EXAMPLE V

The (BTDA-DAB)polyimide according to example I was melt-spun into a a fiber. Therefore, the poly(BTDA-DAB) powder was extruded at a temperature of 330° C. The extruded fiber was stretched 6 times and subsequently winded on a reel. The tensile strength of the resulting fiber was 4.9, according to the tensile test on a Zwick-1435 tensile tester.

We claim:

1. Moulding compound comprising a polyimide comprising monomeric units of 3,3',4,4'-benzophenonetetracarboxylic dianhydride and monomeric units of a primary aliphatic diamine, wherein the primary aliphatic diamine is substantially 1,4-diaminobutane.

2. Moulding compound comprising a polyimide according to claim 1, wherein the diamine contains at least 75 mole % 1,4-diaminobutane.

3. Moulding compound comprising a polyimide according to claim 1, wherein the diamine contains at least 95 mole % 1,4-diaminobutane.

* * * * *